United States Patent [19]

Melindo et al.

[11] Patent Number: 4,528,425
[45] Date of Patent: Jul. 9, 1985

[54] METHOD OF AND CIRCUITRY FOR DETECTING, AT A TELEPHONE EXCHANGE, THE LIFTING OF A SUBSCRIBER'S HANDSET IN RESPONSE TO RINGING CURRENT EMITTED BY THE EXCHANGE

[75] Inventors: Flavio Melindo; Mario Sartori, both of Turin, Italy

[73] Assignee: Cselt-Centro Studi E Laboratori Telecommunicazioni S.p.A., Turin, Italy

[21] Appl. No.: 478,470

[22] Filed: Mar. 24, 1983

[30] Foreign Application Priority Data

Mar. 24, 1982 [IT] Italy ............................. 67371 A/82

[51] Int. Cl.³ ........................................... H04M 3/02
[52] U.S. Cl. ......................... 179/18 HB; 179/18 FA; 179/84 A
[58] Field of Search .......... 179/18 HB, 18 FA, 84 A, 179/84 R

[56] References Cited

U.S. PATENT DOCUMENTS 4,110,569  8/1978  Schindler et al. ............... 179/84 A
4,356,355  10/1982 Ferrieu et al. .................. 179/18 HB
4,362,908  12/1982 Melindo ......................... 179/18 HB
4,396,805  8/1983  Wagner ......................... 179/18 FA Primary Examiner—Gene Z. Rubinson
Assistant Examiner—Elio Di Vito
Attorney, Agent, or Firm—Karl F. Ross; Herbert Dubno

[57] ABSTRACT

In order to detect at an electronic telephone exchange the lifting of a subscriber's handset in response to ringing current sent over the line loop from a generator at that exchange, a charging current proportional to the incoming line current is fed to a capacitor over a recurrent integration period encompassing one or more whole ringing-current cycles. When the handset has been taken off the hook, the capacitor charge present at the end of such a period differs from zero on account of a d-c component superimposed upon the alternating ringing signal. In order to enable the use of a relatively small storage capacitor, the charging current is periodically interrupted by a train of chopping pulses. When the line current is measured at the exchange by a sensor responsive only to absolute magnitude, the polarity of the charging current is reversed in alternate nonzero-amplitude periods of a cycle.

15 Claims, 6 Drawing Figures

METHOD OF AND CIRCUITRY FOR DETECTING, AT A TELEPHONE EXCHANGE, THE LIFTING OF A SUBSCRIBER'S HANDSET IN RESPONSE TO RINGING CURRENT EMITTED BY THE EXCHANGE

FIELD OF THE INVENTION

Our present invention relates to a method of and a circuit arrangement for detecting, at a telephone exchange, the lifting of a subscriber's handset and the resulting closure of a hook switch in response to ringing current emitted by that exchange.

BACKGROUND OF THE INVENTION

As is well known in the art, the closure of a hook switch at a subscriber station of a telephone system shunts a capacitor which lies in series with the line loop and passes the alternating ringing signal, of a low audio frequency between 20 and 50 Hz, but blocks the flow of direct current due to a continuous voltage also applied to the line at the exchange. That voltage is generally much lower than the RMS voltage of the ringing signal which may be as high as 70 V.

In commonly owned U.S. Pat. No. 4,362,908 there has been disclosed a circuit arrangement of this general type suitable for the detection of hook-switch closure in an electronic exchange. As pointed out in that prior patent, such exchanges are incapable of dealing directly with low-frequency ringing currents of the intensity needed to operate a conventional sound generator at a called subscriber station. The use of a low-pass filter with a cut-off frequency of only a few Hz, designed to separate the d-c component from the accompanying alternating signal, requires rather large capacitances which in turn provide such a filter with a large time constant greatly delaying the response of the system to closure of the hook switch. Such capacitors, moreover, cannot be conveniently incorporated in integrated circuitry.

According to the prior patent identified above, a circuit arrangement at an electronic exchange compares the durations of the positive and negative half-cycles of the ringing current whose disparity indicates the superposition of a d-c component upon the alternating signal. That system, while avoiding the drawbacks of earlier solution, still requires a certain minimum ratio of d-c level to a-c peaks in order to be fully effective.

OBJECTS OF THE INVENTION

An important object of our present invention, therefore, is to provide a method of facilitating the detection of such a d-c component even in the presence of a relatively large ringing current.

A related object is to provide a circuit arrangement for implementing that method.

SUMMARY OF THE INVENTION

In accordance with our present inventon, the line current circulating in the subscriber's loop is sensed during emission of ringing current—and in the presence of the continuous voltage applied to the line—to produce a monitoring current which varies proportionally to the sensed line current, at least as far as the absolute magnitude of the latter current is concerned. A bipolar current derived from this monitoring current, varying with the line current (though possibly of relatively inverted polarity), is integrated during a recurrent measuring period which spans a whole number (1 or more) of ringing-current cycles. The result of that integration is compared, at the end of each measuring period, with a predetermined minimum value to determine the existence of a mean amplitude indicative of the presence of the d-c component due to closure of the remote hook switch; detection of that component is followed by a discontinuation of the emission of ringing current and, preferably, a testing of the actual closure of the line loop as described in the prior patent.

In a preferred embodiment, the integration of the bipolar current is carried out by the charging of a storage capacitor which is discharged at the end of each measuring period immediately after a comparison of the voltage thereacross with the aforementioned minimum value.

In many instances, as will become apparent hereinafter, the final voltage developed across the storage capacitor at the end of a measuring period may reach rather high values even with a substantial amplitude step-down between the line current and the charging current. For this reason, according to a further feature of our invention, we prefer to chop the charging current periodically at a pulse rate which is substantially higher than the frequency of the ringing current so that only a fraction of the bipolar current varying with the line current reaches the storage capacitor.

Not infrequently, in an electronic exchange, the line current is being sensed by a polarity-indifferent detector (e.g. via a photocoupler) which produces a pulsating monitoring current reflecting only the absolute magnitude of the line current. In such a case, pursuant to a further feature of our invention, the bipolar current charging the storage capacitor is derived from the unipolar monitoring current with a polarity reversal in alternate pulsation periods of the latter. Two such pulsation periods, separated by an instant of zero amplitude, occur during each line-current cycle.

A circuit arrangement for implementing this method comprises conversion means connected to the line-current sensor for deriving the aforementioned bipolar current from the monitoring current produced by the sensor. An integrator connected to the conversion means, and controlled by timing means responsive to the low-frequency ringing current, determines the mean amplitude of the bipolar current over each measuring period established by the timing means. The integrator works into comparison means signaling a mean amplitude indicative of the lifting of the handset at the called subscriber station.

As noted above, and in accordance with the specific embodiment more fully described hereinafter, the integrator may comprise a storage capacitor chargeable by the bipolar current issuing from the conversion means. This storage capacitor, whose discharge path is normally blocked but is briefly unblocked under the control of the timing means at the end of each measuring period, may be associated with a generator of chopping pulses periodically interrupting the charging of current for the reasons already discussed. The charging and discharging circuits of the storage capacitor advantageously include several transistor pairs, connected as current mirrors, which form part of the integrator and are under the control of the conversion and timing means.

BRIEF DESCRIPTION OF THE DRAWING

The above and other features of our invention will now be described in detail with reference to the accompanying drawing in which.

SPECIFIC DESCRIPTION

Figure 1:
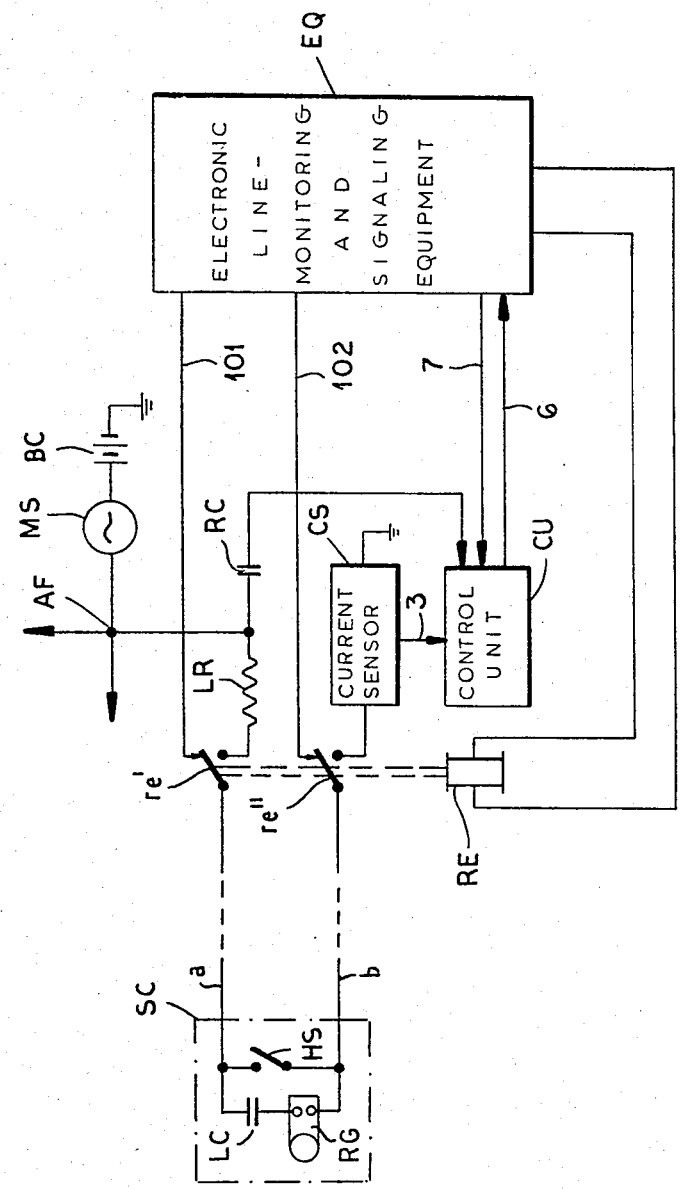
FIG. 1 is a block diagram of a circuit arrangement embodying our invention.

FIG. 1 shows part of a telephone system including a subscriber station SC which is linked by talking conductors a, b with an exchange including conventional electronic line-monitoring and signaling equipment EQ, substantially as illustrated in commonly owned U.S. Pat. No. 4,362,908 referred to above. Only so much of station SC has been depicted as is necessary for an understanding of our invention, namely a capacitor LC connected in series with an electromechanical ringer RG between line conductors a and b while being shunted by a normally open hook switch HS.

At the exchange, a switching relay RE has armatures re', re'' normally joining conductors a and b to respective leads 101, 102 of a line extension terminating at the central-office equipment EQ which detects the open or closed condition of the line loop, receives dial pulses from station SC and establishes calling connections between that station and remote subscribers. Upon the arrival of a call from a remote station destined for station SC, equipment EQ energizes the relay RE which attracts its armatures to connect an oscillator MS, in series with a direct-current source (shown as a battery) BC having a grounded negative terminal, via a resistor LR to line conductor a while conductor b is simultaneously switched to a current sensor CS. An output lead 3 of this sensor extends to a control unit CU which also receives, via a blocking capacitor RC and a lead 1, the ringing signal emitted by generator MS. This signal may have a frequency of 25 Hz and may be on for one second at a time, as assumed in that prior patent. The same ringing signal can also reach other subscriber stations, not shown, via a junction AF.

Control unit CU, more fully described hereinafter with reference to FIG. 2, has another input connected to a lead 7 originating at equipment EQ and carrying a train of high-frequency clock pulses with a cadence of, for example, 8 KHz and a duration of 3.9 μs as conventionally used to establish the time slots in a communication system of the pulse-code-modulation (PCM) type. Unit CU also has an output lead 6 which informs the equipment EQ of the detection of a significant d-c component and causes an at least temporary release of relay RE; the relay may be reactivated, as described in the prior patent, if the detected d-c component is found to have been due to a spurious noise signal rather than to a closure of hook switch HS.

Figure 2:
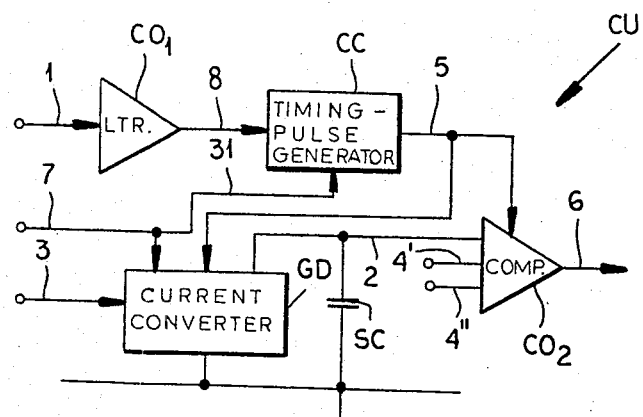
FIG. 2 is a more detailed diagram of a control unit shown in FIG. 1.

Control unit CU, as shown in FIG. 2, comprises a limiting amplifier or threshold comparator $CO_1$ which clips the amplitudes of the sinusoidal ringing signal on lead 1 and converts it into a square wave transmitted on a lead 8 to a pulse generator CC. The latter has an output lead 5 on which a relatively short timing pulse appears after each full cycle of the square wave, this pulse being fed to an activating input of a threshold comparator $CO_2$ whose output is connected to the lead 6 extending to equipment EQ in FIG. 1. The timing pulse emitted by generator CC is also sent to a current converter GD with further inputs connected to the leads 3 and 7; an extension 31 of lead 7 terminates at a control input of generator CC. A storage capacitor SC, with one grounded plate, has another plate tied to a lead 2 which extends from current converter GD to an input of comparator $CO_2$; this comparator has two further input leads 4' and 4'' carrying positive and negative threshold voltages as described hereinafter with reference to FIG. 4.

Figure 3:
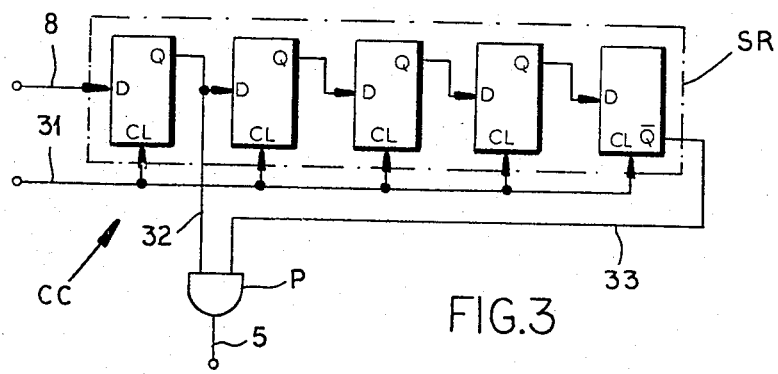
FIGS. 3, 4 and 5 show further details of certain components of that control unit.

Timing-pulse generator CC could be simply a differentiator, responsive to the leading edge of the first half-cycle of the ringing signal, but preferably has the structure shown in FIG. 3 in order to produce a more sharply defined end-of-cycle signal. Current converter GD will be described in greater detail with reference to FIG. 5.

As illustrated in FIG. 3, pulse generator CC comprises a shift register SR with five cascaded binary stages in the form of respective data-type flip-flops. Each of these stages has a clock input CL connected to lead 31 which carries the high-frequency pulses emitted by equipment EQ of FIG. 1 on its output lead 7. The data input D of the first stage is connected to lead 8, originating at limiting amplifier $CO_1$ of FIG. 2, while corresponding inputs of all the other stages are connected to the set outputs Q of the respective preceding stages. Output Q of the first stage is also connected, via a lead 32, to an input of an AND gate P having another input joined by a lead 33 to the reset output $\bar{Q}$ of the last stage of register SR. Gate P, whose output is tied to lead 5, conducts when the first flip-flop of shift register SR is set while the last flip-flop is still reset, thus for an interval encompassing five clock pulses on lead 31. This interval is initiated, in the present instance, by the first clock pulse coinciding with high voltage on lead 8 in a positive half-cycle of the square wave emitted by amplifier $CO_1$; when that voltage drops to zero (or possibly goes negative), all previously set flip-flops are sequentially reset whereupon the output pulse of gate P is again generated at the beginning of the next cycle. This output pulse, therefore, exactly encompasses a number of clock pulses (here five) corresponding to the number of shift-register stages utilized.

Figure 4:
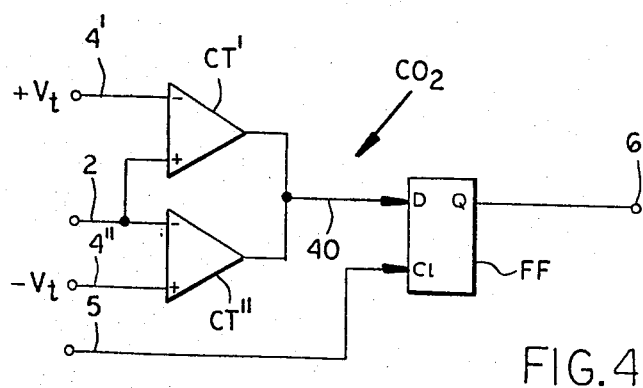

FIG. 4 shows the comparator $CO_2$ as comprising two differential amplifiers CT' and CT'' with a common output lead 40 terminating at the data input D of a flip-flop FF whose clock input is tied to the output lead 5 of gate P (FIG. 3) and whose set output Q is connected to lead 6. Differential amplifier CT' has a noninverting input tied to lead 2 and an inverting input connected to lead 4' which carries a positive threshold voltage $+V_t$; analogously, differential amplifier CT'' has an inverting input tied to lead 2 and a noninverting input connected to lead 4'' which carries a negative threshold voltage $-V_t$.

Figure 5:
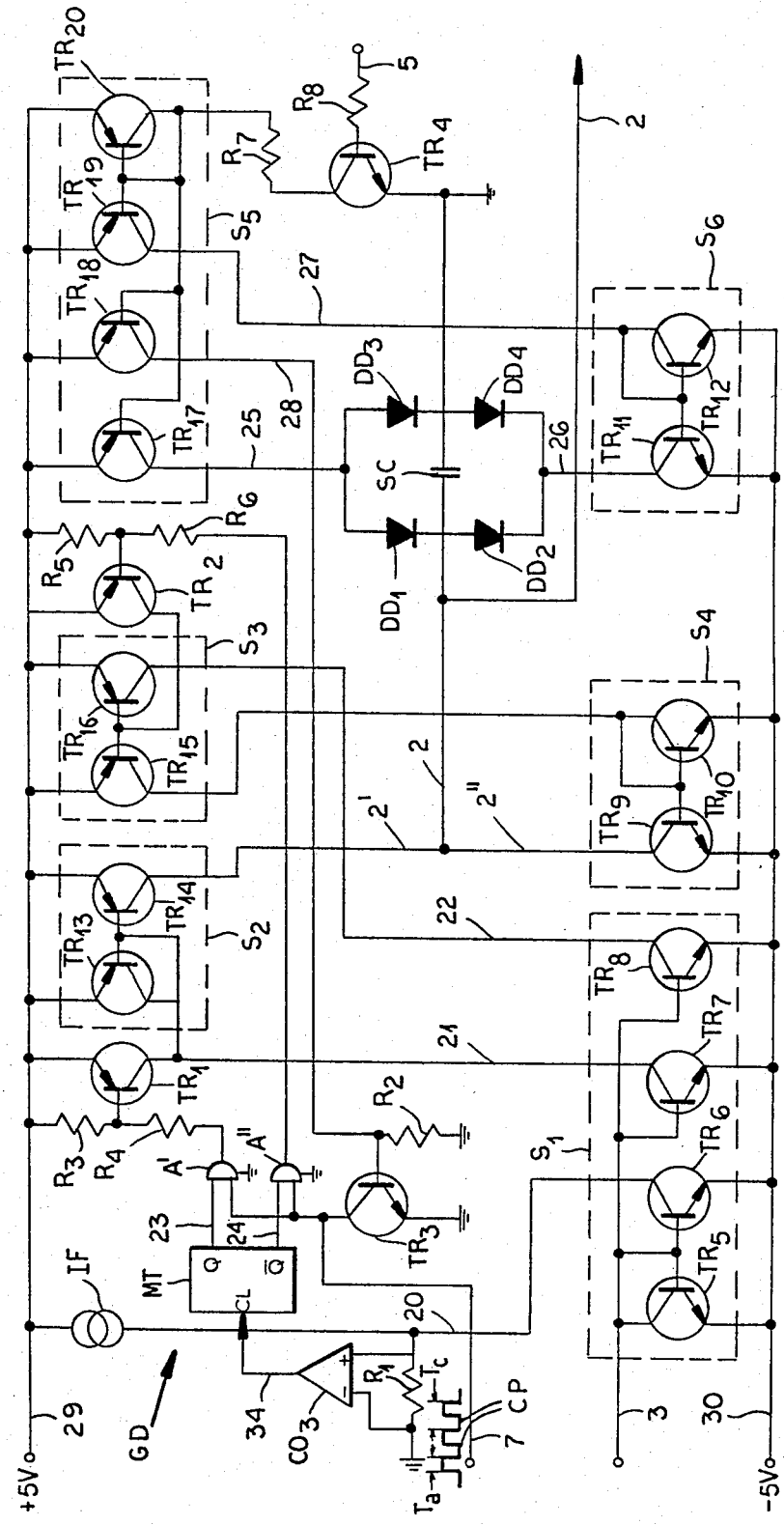

The absolute value of voltages $\pm V_t$ (FIG. 4) is a small fraction of a balanced supply voltage of $\pm 5$ V present on a positive lead 29 and a negative lead 30 shown in FIG. 5. Current converter GD, as illustrated in this Figure, comprises eight NPN transistors $TR_5$–$TR_{12}$, with emitters tied to negative supply lead 30, and ten PNP transistors $TR_1$, $TR_2$ and $TR_{13}$–$TR_{20}$ with emitters tied to positive supply lead 29. Transistors $TR_5$–$TR_8$ form part of a switching network $S_1$ including a current-mirror pair constituted by transistors $TR_5$ and $TR_6$. Other current-mirror pairs are formed by transistors $TR_{13}$ and $TR_{14}$ in a switching network $S_2$, by transistors $TR_{15}$, $TR_{16}$ in a switching network $S_3$, by transistors $TR_{17}$, $TR_{18}$ in a switching network $S_4$, by transistors $TR_{19}$, $TR_{20}$ in a switching network $S_5$ also including the transistors $TR_{17}$ and $TR_{18}$, and by transistors $TR_{11}$, $TR_{12}$ in a switching network $S_6$. The bases of transistors $TR_5$–$TR_8$ are connected in parallel to lead 3 which is also tied to the collector of transistor $TR_5$, connected as a diode. A collector lead 20 of transistor $TR_6$ is connected to ground via a resistor $R_1$ to which a biasing current is fed from supply lead 29 by way of a constant-current generator IF. The ungrounded terminal of resistor $R_1$ is joined to a noninverting input of a differential amplifier $CO_3$ whose inverting input is grounded; amplifier $CO_3$ conducts whenever the collector current of transistor $TR_6$ exceeds the biasing current from generator IF traversing the resistor $R_1$ in the opposite direction. The output of amplifier $CO_3$ is connected by a lead 34 to a clock input CL of a set/reset flip-flop MT whose outputs Q and $\bar{Q}$ are connected by respective leads 23 and 24 to first inputs of two AND gates A' and A"; the second inputs of these two gates are connected to the lead 7 which also is tied to the collector of an NPN transistor $TR_3$ with grounded emitter. The base of transistor $TR_3$ is linked by a lead 28 with the collector of transistor $TR_{18}$ and is grounded through a resistor $R_2$.

The collector of transistor $TR_7$ is tied through a lead 21 to the collectors of transistors $TR_1$ and $TR_{13}$ as well as to the bases of current-mirror pair $TR_{13}$, $TR_{14}$. The base of control transistor $TR_1$ is connected to the junction of two resistors $R_3$ and $R_4$ inserted as a voltage divider between supply lead 29 and the output of AND gate A'. In a similar manner, a voltage divider formed by resistors $R_5$ and $R_6$ with a junction tied to the base of control transistor $TR_2$ is inserted between supply lead 29 and the output of AND gate A". The collectors of transistors $TR_2$, $TR_8$ and $TR_{16}$ are interconnected by a lead 22 also tied to the bases of the current-mirror pair $TR_{15}$, $TR_{16}$. A further NPN transistor $TR_4$ is connected in cascade with PNP transistor $TR_{20}$ between ground and supply lead 29 through the intermediary of a resistor $R_7$; the base of transistor $TR_4$ is joined to lead 5 through a resistor $R_8$.

Storage capacitor SC, inserted as in FIG. 2 between conductor 2 and ground, is connected across one diagonal of a diode bridge with arms $DD_1$–$DD_4$ whose other diagonal lies between collector leads 25 and 26 of transistors $TR_{17}$ and $TR_{11}$. Simultaneous conduction of these transistors, therefore, will discharge the capacitor SC by bringing its ungrounded plate to zero potential, provided that transistors $TR_9$ and $TR_{14}$ are cut off. With transistors $TR_{11}$ and $TR_{17}$ nonconductive, conduction of transistor $TR_9$ or $TR_{14}$ will connect lead 2 to supply lead 29 or 30 via their respective collector leads 2' and 2" so as to charge the capacitor with one or the other polarity.

If sensor CF of FIG. 1 detects only the absolute magnitude of the line current traversing conductor b, the monitoring current on lead 3 will consist of unipolar pulsations (positive in the example here assumed). It therefore becomes necessary to render transistors $TR_9$ and $TR_{14}$ alternately conductive in two consecutive pulsation periods of this current whose combined length equals a cycle of the ringing signal. While current converter GD does not have information on the instantaneous polarity of the line current, it is immaterial for present purposes whether the charging current on lead 2 is in phase or in counterphase with that line current. The switchover is carried out by flip-flop MT as more fully discussed hereinafter.

Let us assume, for the moment, that the charging current on lead 2 is uninterrupted during each pulsation period and is proportional to the line current with a step-down ratio of $K_1$:1. The capacitor voltage $V_c$ at the end of an integration period of n ringing-current cycles of duration T (n being an integer), due to a residual charge caused by a d-c flow $I_{dc}$ in line loop a, b, is then given—in absolute terms—by:

$$V_c = K_1 \cdot \frac{I_{dc} \cdot nt}{q} \quad (1)$$

where q is the capacitance of condenser SC. With n=1 and T=40 μs, corresponding to a ringing frequency of 25 Hz, and with a capacitance q=1 μF, a line current of, say, 10 mA would require a step-down ratio of $K_1$=1:400 if voltage $V_c$ were to be held to 1 V. Such a ratio is difficult to realize with present-day integrated-circuit technology. It is for this reason that, in the preferred embodiment being described, we have included chopping means designed to reduce the voltage $V_c$ of equation (1) by a further ratio $K_2 = T_c/T_a$ where $T_c$ is the period and $T_a$ is the width of the pulses appearing on lead 7 which, as assumed above, may have parameters of $T_c$=125 μs and $T_a$=3.9 μs, yielding a ratio of $K_2$=32. Thus, a ratio of $K_1$=1:8 will suffice to provide an overall step-down ratio of 1:400 according to the modified formula:

$$V_c = \frac{K_1}{K_2} \cdot \frac{I_{dc} \cdot nT}{q} \quad (2)$$

It should be understood, however, that chopping pulses of different width and/or recurrence period may be utilized and, furthermore, that the clock pulses applied on lead 31 to shift register SR (FIG. 3) need not necessarily be the same as those appearing on lead 7.

Figure 6:
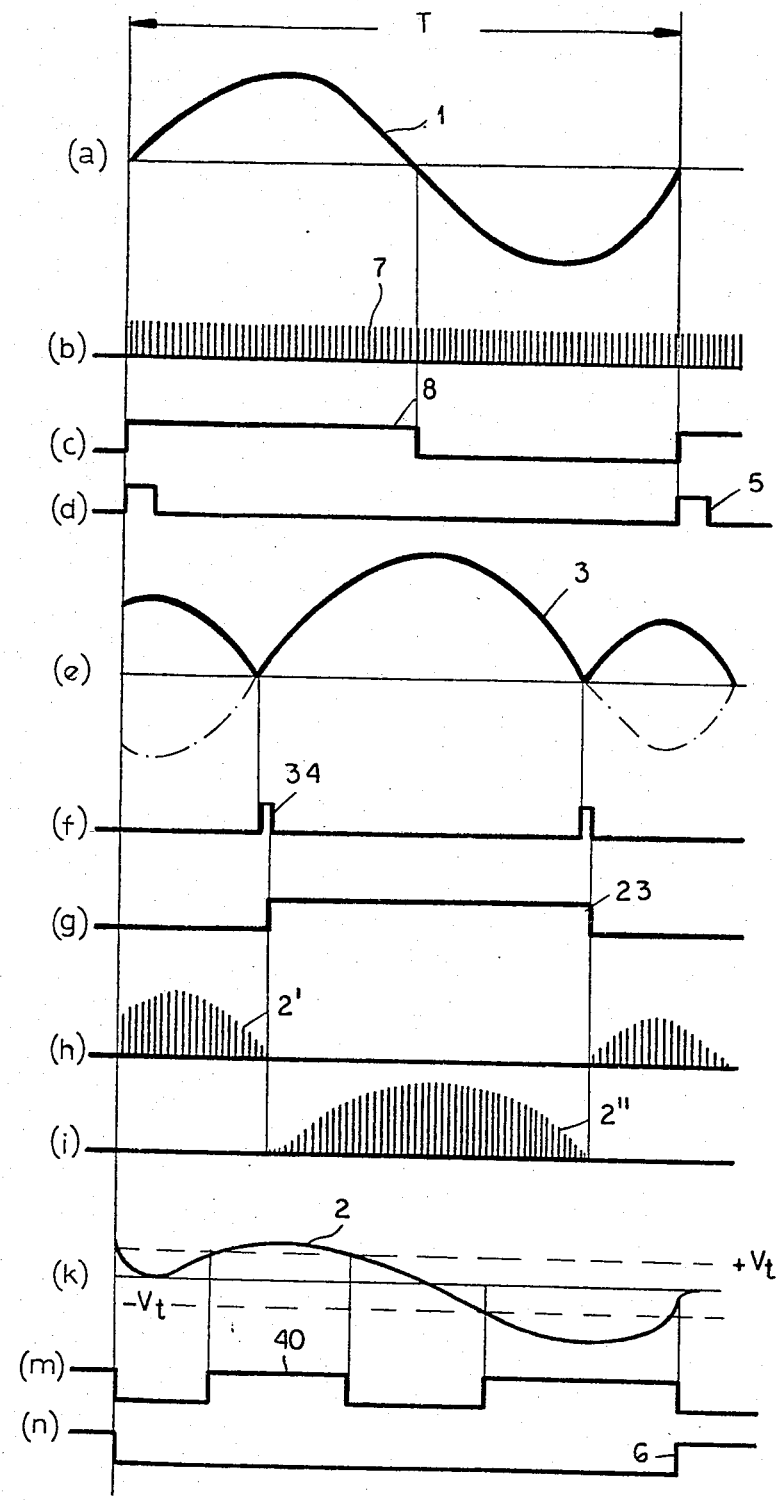
FIG. 6 is a set of graphs relating to the operation of the disclosed circuitry.

In the following description of the mode of operation of our improved loop-closure detector, reference will be made to FIG. 6 showing the waveforms on various conductors of FIGS. 2–5 as marked on the respective graphs. Thus, graph (a) shows the sinusoidal ringing signal present on lead 1 when the exchange calls the subscriber station SC of FIG. 1. Graph (b) depicts the train of clock pulses on lead 7 whose interstices CP, indicated in FIG. 5, interrupt the charging of capacitor SC by grounding one input of each AND gate A', A". Graph (c) represents the square wave present on lead 8 which controls the shift register SR of FIG. 3 to produce the timing pulse appearing on lead 5 at the end of each cycle of that wave as illustrated in graph (d). The unipolar monitoring current emitted on lead 3 by sensor CS is shown in graph (e) and, on going to zero, allows the biasing current from generator IF to surpass the threshold of differential amplifier or comparator $CO_3$ to generate a spike on lead 34 as indicated in graph (f). That spike alternately sets and resets the flip-flop MT whereby the lead 23 connected to its output Q conducts during every other nonzero-amplitude or pulsation period of the monitoring wave as shown in graph (g). These pulsation periods coincide with respective half-cycles of the line current in the absence of a superposed d-c component but differ from each other within a line-current cycle, as exaggeratedly indicated in graph (e), when such a component is present. The waveform on the complementary output lead 24 of flip-flop MT, not represented in FIG. 6, is of course an inversion of that shown in graph (g).

When voltage on lead 3 is high, transistor $TR_7$ conducts to connect the common collector lead 21 of transistors $TR_1$ and $TR_{13}$ to negative potential on supply lead 30. With AND gate A' cut off so that its output voltage is low, transistor $TR_1$ also conducts and prevents the conduction of mirror pair $TR_{13}$, $TR_{14}$ in switching network $S_2$ until the appearance of a clock pulse on lead 7 unblocks the gate A' and cuts off the transistor $TR_1$. Transistor $TR_{14}$, therefore, periodically charges the capacitor SC positive via leads 2' and 2 until the voltage on lead 3 goes to zero and flip-flop MT is reset as described above. With AND gate A" now intermittently conducting, the periodic cutoff of transistor $TR_2$ causes transistor $TR_{16}$ to conduct in its stead in series with transistor $TR_8$ which is turned on by the energization of lead 3. Its twin $TR_{15}$ therefore conducts also, as do transistors $TR_9$ and $TR_{10}$ of switch network $S_4$ whereby capacitor SC is charged negative via leads 2" and 2. The pulsating waveforms thus appearing on leads 2' and 2" during alternate half-cycles, whose envelopes conform to the current flow on lead 3, have been depicted in graphs (h) and (i). The resulting charge of capacitor SC produces an integrated voltage on output lead 2 seen in graph (k). When the absolute magnitude of that voltage surpasses that of threshold $+V_t$ and $-V_t$ (FIG. 4), respectively, output lead 40 of differential amplifiers CT' and CT" is energized as shown in graph (m); the coincidence of such energization with a timing pulse on lead 5, graph (d), energizes the lead 6 as shown in graph (n).

The same timing pulse, applied via resistor $R_8$ to the base of transistor $TR_4$, turns on this transistor together with transistors $TR_{17}$ and $TR_{20}$ of network $S_5$ and transistors $TR_{11}$ and $TR_{12}$ of network $S_6$. With transistors $TR_{11}$ and $TR_{17}$ now conducting, storage capacitor SC is discharged preparatorily to a new charging cycle unless, of course, the energization of lead 6 causes equipment EQ (FIG. 1) to release the relay RE so as to disconnect the sensor CS from the line b.

The use of a cycle count $n>1$, obtained for example by means of a frequency divider in the output of pulse generator CC (FIG. 2), provides greater stability against spurious triggering. The resulting increase in capacitor voltage $V_c$ can be canceled by a corresponding reduction of ratio $K_1$ or increase of ratio $K_2$.

We claim:

1. A method of detecting at a telephone exchange, provided with a generator ringing current of low audio frequency connectable across a line loop leading to a called subscriber station, a response of the called subscriber which involves closure of a normally open hook switch shunting a series capacitor in the line forming said loop whereby a continuous voltage applied to the line at the exchange gives rise to a direct-current component superimposed upon the alternating ringing current, comprising the steps of:
 (a) sensing the line current circulating in said loop during emission of ringing current in the presence of said continuous voltage, with generation of a monitoring current whose absolute amplitude varies proportionally with that of said line current;
 (b) integrating a bipolar current, derived from said monitoring current and proportional to the sensed line current, during a recurrent measuring period spanning a whole number of ringing-current cycles;
 (c) comparing the result of integration in step (b) at the end of each measuring period with a predetermined minimum value to determine the existence of a mean amplitude indicative of said direct-current component; and
 (d) discontinuing the emission of ringing current in response to said mean amplitude.

2. A method as defined in claim 1 wherein the integration in step (b) involves the charging of a storage capacitor with said bipolar current, followed by a discharge of said storage capacitor immediately after comparing the voltage thereacross with said minimum value in step (c).

3. A method as defined in claim 2 wherein, for limiting the final voltage existing across said storage capacitor at the end of a measuring period, said bipolar current is periodically chopped in step (b) at a pulse rate substantially higher than the frequency of said ringing current.

4. A method as defined in claim 2 wherein only the absolute magnitude of the line current is sensed in step (a) whereby said monitoring current has two pulsation periods of the same polarity in each cycle of said line current, the bipolar current charging the storage capacitor in step (b) being derived from said monitoring current with a reversal of polarity in alternate pulsation periods thereof.

5. In a telephone system wherein an exchange is linked with an associated subscriber station via a two-conductor line whose conductors are interconnected at said station by a ringer in series with a capacitor shunted by a normally open hook switch, said ringer being operable in an open state of said hook switch by alternating current of low audio frequency transmitted over said line along with a continuous voltage whereby a direct-current component is superimposed upon said alternating current on closure of said hook switch, the combination therewith of circuitry for detecting said direct-current component as a signal that the hook switch has been closed, said circuitry comprising:
 sensing means coupled to said line for producing a monitoring current of a magnitude proportional at least in absolute magnitude to the line current;
 conversion means connected to said sensing means for deriving from said monitoring current a bipolar current proportional to said line current;
 timing means responsive to said alternating current for establishing a recurrent measuring period spanning a whole number of cycles of said low audio frequency;
 integrating means connected to said conversion means and controlled by said timing means for determining the mean amplitude of said bipolar current over each measuring period; and
 comparison means connected to said integrating means for signaling a surpassing of a predetermined minimum value by said mean amplitude.

6. The combination defined in claim 5 wherein said integrating means comprises a storage capacitor chargeable with said bipolar current.

7. The combination defined in claim 6 wherein said storage capacitor is provided with a normally blocked discharge path coupled with said timing means for unblocking at the end of each measuring period, said comparison means being activable by said timing means just prior to the unblocking of said discharge path.

8. The combination defined in claim 7 wherein said circuitry further comprises a generator of chopping pulses, of a recurrence rate substantially exceeding said low audio frequency, connected to said integrating means for periodically interrupting the charging of said storage capacitor a multiplicity of times during each measuring period.

9. The combination defined in claim 7 wherein said integrating means comprises a positive supply lead, a negative supply lead, first transistor means inserted between said storage capacitor and said positive supply lead, and second transistor means inserted between said storage capacitor and said negative supply lead, said first and second transistor means being controlled by said conversion means for conducting during alternate nonzero-amplitude periods in each cycle of said monitoring current.

10. The combination defined in claim 9 wherein said monitoring current is unipolar, said conversion means including threshold means sensitive to the magnitude of said monitoring current for switching between said first and second transistor means.

11. The combination defined in claim 10 wherein said threshold means comprises a voltage comparator connected across a grounded resistor, said sensing means having an output connected across said resistor together with a source of constant biasing current having a polarity opposite that of said monitoring current, and a flip-flop alternately settable and resettable by said voltage comparator in response to zero amplitude of said monitoring current.

12. The combination defined in claim 9 wherein said first and second transistor means include transistor pairs connected as current mirrors.

13. The combination defined in claim 9 wherein said discharge path includes a diode bridge with one diagonal connected between said supply leads and another diagonal connected across said storage capacitor.

14. The combination defined in claim 5 wherein said timing means comprises a shift register with a plurality of cascaded binary stages, limiter means connected to a generator of said alternating current for converting same to a square wave fed to the first of said stages, a source of high-frequency stepping pulses connected in parallel to clock inputs of said stages, and a coincidence gate with inputs connected to outputs of the first and the last of said stages for conducting at the beginning of a cycle of said square wave during a small fraction of said cycle.

15. The combination defined in claim 7 wherein said integrating means is provided with gate means connected to said timing means for blocking the charging of said storage capacitor during the unblocking of said discharge path.

* * * * *